United States Patent [19]

Beauducel

[11] Patent Number: 5,077,698
[45] Date of Patent: Dec. 31, 1991

[54] METHOD AND DEVICE FOR THE HIGH-RATE TRANSMISSION OF DATA FOLLOWING A QUASI-ASYNCHRONOUS MODE

[75] Inventor: Claude Beauducel, Henonville, France

[73] Assignee: Institut Francais du Petrole, Rueil Malmaison, France

[21] Appl. No.: 605,490

[22] Filed: Oct. 30, 1990

[30] Foreign Application Priority Data

Oct. 30, 1989 [FR] France .................. 89 14346

[51] Int. Cl.$^5$ .......................... G01V 1/22; H04J 3/00; H04J 14/08
[52] U.S. Cl. ........................ 367/79; 370/91; 340/870.13; 367/78; 455/53
[58] Field of Search .............. 367/20, 76, 78, 79; 370/91, 94.2, 85, 103; 340/870.13; 455/51, 53, 56

[56] References Cited

U.S. PATENT DOCUMENTS

| | | | |
|---|---|---|---|
| 3,873,961 | 3/1975 | Lee et al. ............................... | 367/79 |
| 4,112,412 | 9/1978 | Howlett ................................ | 367/79 |
| 4,398,271 | 8/1983 | Cretin et al. ......................... | 367/20 |
| 4,509,170 | 4/1985 | Hollinger et al. ............... | 340/870.13 |
| 4,628,494 | 12/1986 | Rialan et al. ......................... | 455/56 |
| 4,787,069 | 11/1988 | Beauducel et al. .................... | 367/79 |
| 4,835,744 | 5/1989 | Todd et al. ........................... | 367/20 |
| 4,905,205 | 2/1990 | Rialan ................................. | 367/77 |

FOREIGN PATENT DOCUMENTS 2597225 10/1987 France .

Primary Examiner—Ian J. Lobo
Attorney, Agent, or Firm—Antonelli, Terry, Stout & Kraus

[57] ABSTRACT

Method and device for the high-rate transmission of data between a multiplicity of acquisition apparatuses (Ai) and a central station to which they are connected by a common transmission channel (V1) for commands and by a high-rate transmission channel (V2) for data.

A first clock signal (H1) serves for the transmission of the orders, the acquisition of the data and their storage in a memory (10). A second clock signal (H2) with a higher frequency non synchronous with the first one is used for reading the data stored by each acquisition apparatus. A determined time interval (or window) is assigned to each apparatus and the reading of each stored sample is activated by an order signal indicating the beginning of this window.

Application to a seismic transmission system for example.

6 Claims, 2 Drawing Sheets

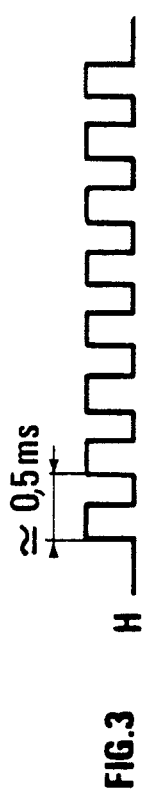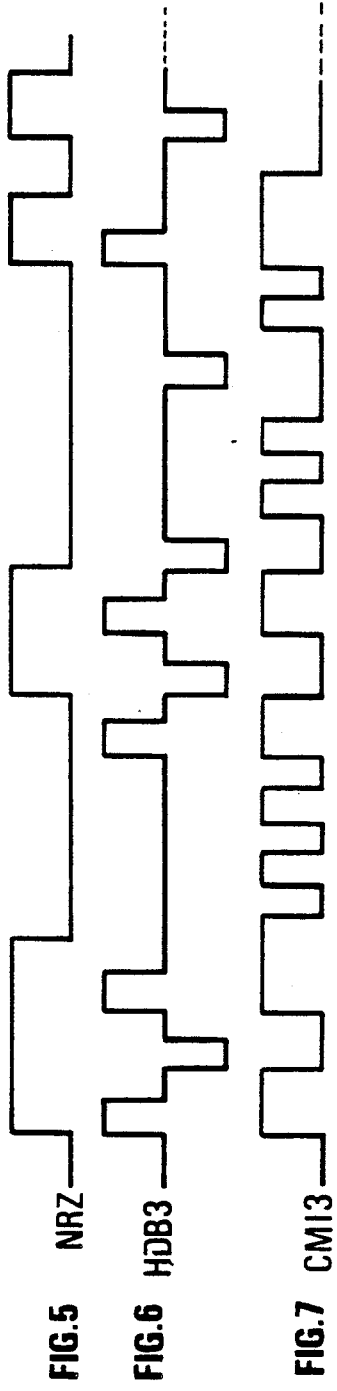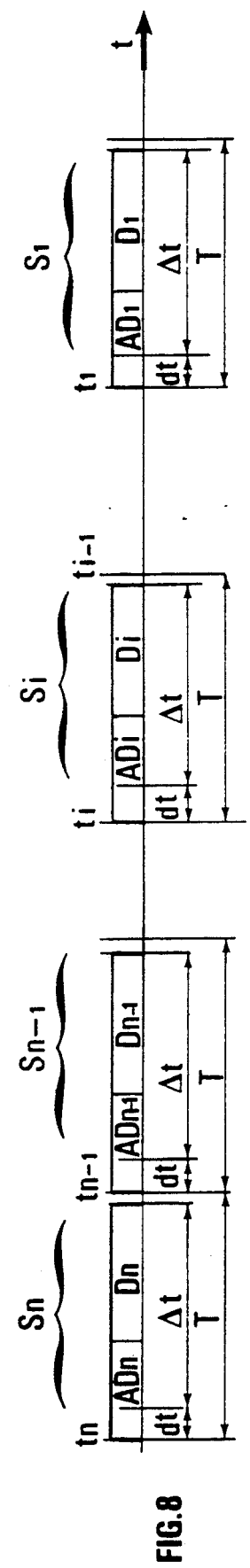

METHOD AND DEVICE FOR THE HIGH-RATE TRANSMISSION OF DATA FOLLOWING A QUASI-ASYNCHRONOUS MODE

BACKGROUND OF THE INVENTION

The present invention relates to a method and a device for the high-rate transmission, towards a central station and in a quasi-asynchronous mode, of data coming from a multiplicity of signal acquisition apparatuses which are connected with the central station by common transmission channels.

The method and the device are particularly useful for the sequential transmission, towards a central station, of data coming from a great number of acquisition apparatuses sharing common transmission channels. This is notably the case with transmission systems in offshore seismic prospecting. An often considerable number of seismic receivers, such as hydrophones for example, are distributed at regular intervals all along a supple sheath of very great length or a seismic streamer, consisting of the interconnection of a multiplicity of sections. The seismic streamer is towed behind a ship moving along a seismic profile to be explored, and successive cycles of emission of acoustic signals and of reception of the signals sent back by the subsoil discontinuities in response to the emitted signals are achieved. The signals picked up by the seismic receivers during each cycle are, in recent seismic streamers, collected by acquisition apparatuses arranged in boxes intercalated between the successive streamer sections, sampled, digitized and stored. The different apparatuses are linked by common transmission channels arranged along the streamer, with a central recording station or laboratory located on the ship. One or several channels serve for the transmission of coded command addressed to the different apparatuses by a central laboratory on the ship.

One or several channels are used for the transmission towards the latter of the signals emitted by the different apparatuses in response to the received command. At the end of each emission-reception cycle, the different apparatuses receive commands to sequentially transmit to the laboratory the data that they have stored. Such seismic streamers are described, for example, in French patents 2,471,088 (U.S. Pat. Nos. 4,398,271) or 2,590,684 (U.S. Pat. No. 4,787,069).

The current trend in geophysics is the lengthening of seismic streamers. The correlative increase in the number of receivers allows, as it is well-known, the sharpening of the seismic profiles that can be established from the recordings centralized in the laboratory. Since the number of signals to be transmitted increases, it is necessary to raise the rate of the transmission channels utilized in order to limit as much as possible the intervals between the successive emission and reception cycles. If the objective is to manufacture a seismic streamer that can supply 1,000 to 1,500 distinct recording traces, transmission rates ranging from 30 to 40 Mbits/s are imperative. The most simple method essentially consists in utilizing rapid transmission channels (coaxial cables or optical fibers) and in increasing the frequency of the clock signals punctuating the sequential data transmission. Nevertheless, this results in a rapid increase in the manufacturing cost because the numerous acquisition apparatuses of the streamer should also include electronic components capable of great performance but therefore very costly, especially if the total power consumption is attempted to be limited. This is why the optimizing of the transmission rate of the seismic signals themselves is also sought.

The digitized signals to be transmitted are generally inserted in a frame with a well-developed structure comprising several cells used for identifying the number or signature of the acquisition apparatus in question and the nature of the digitized information included in the frame, so that the reception set in the central laboratory can separate and classify the sequentially transmitted signals.

A well-known method which is applied and described in the above cited French patent 2,471,088 or U.S. Pat. No. 4,398,271 consists in using a transmission code adapted to the transmission of a clock signal and in fitting each acquisition apparatus in the streamer with emission and reception modules. All the coded digital words in transit on the transmission channels are systematically decoded so that each apparatus can determine if it is actually concerned and, in this case, include into the frame in transit the suitable digitized datum. The positioning of the digital words one after the other is therefore performed in a very rigorous way. At the output of each acquisition apparatus, the digital words are coded again before their application on the transmission channels. The multiplicity of the controls carried out all along the transmission channels has the effect of limiting the centralization speed of the seismic signals. The previous method is therefore very well adapted to transmission rates that are not really high.

SUMMARY OF THE INVENTION

The above mentioned drawbacks are avoided by the method according to the invention concerning the high-rate transmission of digitized data between a multiplicity of acquisition apparatuses and a central station which they are connected with by at least one first channel for the transmission of control signals and at least one second data transmission channel with a transmission rate higher than that of said first channel, and these apparatuses being for example those used in a seismic transmission system. The method according to the invention comprises the use of at least one transmission code such as the control signals, and the transmitted data are superposed respectively on a first clock signal and on a second clock signal with a frequency higher than that of the first clock signal, the acquisition and the storing of the data being performed in accordance with the first clock signal.

The method is characterized by the selective allocation to each acquisition apparatus of a transmission time interval of a determined duration, and by the permanent emission of the second clock signal on said data transmission channel, each data transmission successively comprising:

the sequential addressing, to all the acquisition apparatus, of control signals, each one of them indicating the moment of beginning of the transmission interval respectively assigned to each acquisition apparatus, and at the reception by said acquisition apparatus of the corresponding control signal, the reading of data stored therein in synchronism with the second clock signal and transmission thereof on said data transmission channel from a moment compatible with the clock signal used for reading said data.

The method applies, for example, to a transmission system where at least the second transmission channel comprises an optical fiber.

The device for the implementing of the method provides a high-rate transmission of data between a multiplicity of data acquisition apparatus, each one being adapted for collecting, sampling, digitizing, storing signals, and coding them in accordance with a reference signal and a centralization station provided with means for generating coded control signals according to a first clock signal and which can be selectively addressed to the different acquisition apparatus, the latter being all connected with the central station by a common linking set comprising at least one first channel for the transmission of said control signals and at least one second transmission channel with a transmission rate higher than that of the first channel, which is linked with means emitting a second clock signal.

The device is characterized by transmission sets respectively associated with the different acquisition apparatus, each one comprising:
extracting means for permanently reproducing the second clock signal emitted on said second transmission channel,
decoding means for decoding on said first transmission channels specific control signals indicating the beginning of a predetermined time interval assigned to the associated acquisition apparatus for the emission of the stored signals, and
emitting means for emitting said stored signals in synchronism with the second clock signal from said extracting means, during said predetermined time interval.

According to one embodiment of the implementing device, the second transmission channel is an optical fiber connected with each acquisition apparatus by electric/optical conversion means.

According to another embodiment of the implementing device, each transmission set comprises a logical control set adapted for controlling the acquisition of the data in synchronism with the first clock signal, a storing element for storing the coded signals from the corresponding acquisition apparatus, and the emitting means comprise means for reading the storage element in synchronism with the second clock signal and switching means operated by the logical control set, in order to intermittently connect said storage element with the second transmission channel.

The implementing device can also comprise a coding element in order to apply to the signals to be transmitted a particular transmission code.

The method and the implementing device according to the invention allow use of two very different clock speeds for the acquisition of the data and the transmission of the commands on one hand and for the transmission of the data on the other hand, without it being necessary to synchronize them, this being obtained by allowing a certain time lag in the transmission within an imposed transmission window. It is thereby possible to reduce the amount of very high-performance electronic elements that are necessary to build up a high-rate transmission system.

BRIEF DESCRIPTION OF THE DRAWINGS

Other features and advantages of the method and the device according to the invention will be clear from reading the description hereafter of an embodiment procedure and given by way of a non limitative example, applied to a marine seismic streamer, and with reference to the accompanying drawings in which:

FIGS. 3 to 7 are chronograms showing different codes utilized for coding the digitized data to be transmitted; and FIG. 8 is a chronogram showing the succession of respective time intervals or windows assigned to the different acquisition apparatuses for their transmission.

DESCRIPTION OF THE PREFERRED EMBODIMENTS

Figure 1:
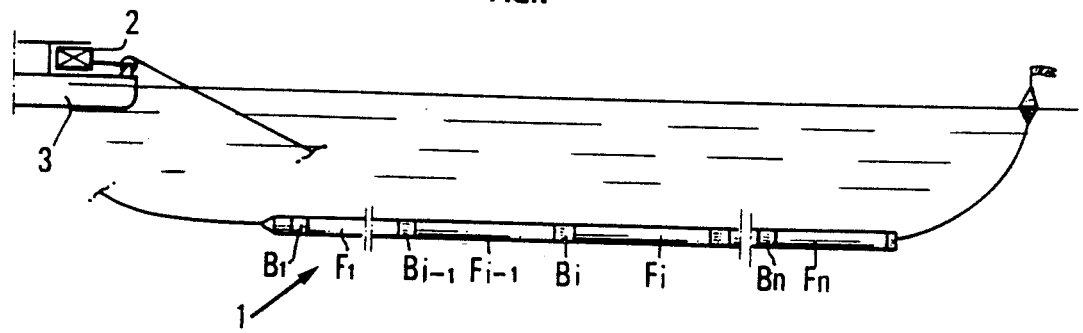
FIG. 1 diagrammatically represents a marine seismic streamer towed under water.

A marine seismic streamer such as those which are described in the French patents cited above generally comprise (FIG. 1) a supple tubular sheath 1 of great length consisting of a often considerable number of successive sections $F_1$, $F_{i-1}$ ... $F_i$ ... $F_n$ interconnected with one another by means of interconnection boxes $B_1$ to $B_n$. Seismic receivers (not shown) are arranged all along the sheath. Receivers $R_1$, $R_2$ ... $R_j$ ... $R_n$ of a same section $F_i$ (FIG. 2) transmit the signals they pick up to a seismic acquisition apparatus $A_i$ arranged in an interconnection box $B_i$ at one end of section $F_i$. Common transmission channels linking the different acquisition devices to a central station or laboratory 2 installed on a ship 3 towing the immersed streamer (FIG. 1) are arranged along the seismic streamer. A channel V1 is reserved for the transmission of coded command addressed to the different acquisition apparatus $A_i$ along the streamer by the central laboratory 2. A second channel V2 is assigned to the transmission towards the latter of the data signals transmitted by the different acquisition apparatuses in response to the received commands. In case the rate of the commands passing in transit through channel V2 is very high (about several ten Mbits/s), one or several optical fibers are preferably used. The rate of the signals along channel V1 is generally much lower (about several Mbits/s for example). One or several optical fibers can be utilized for achieving it, or possibly twin cables, if the required rate is not too high. Channels V1 and V2 are interconnected with the electric conducting wires in each end box $B_i$ by means of adaptation modules of a well-known type $M_{i-1}$, $M_i$ ... each one fitted with a receiver 4 and an transmitter 5. In case channels V1 and/or V2 are optical fibers, these modules are adapted for converting the optical signals into electric signals for their treatment by the electronic elements within each box $B_i$, or conversely for translating the electric signals into optical signals for their transmission on the fibers, as described hereafter.

Figure 2:
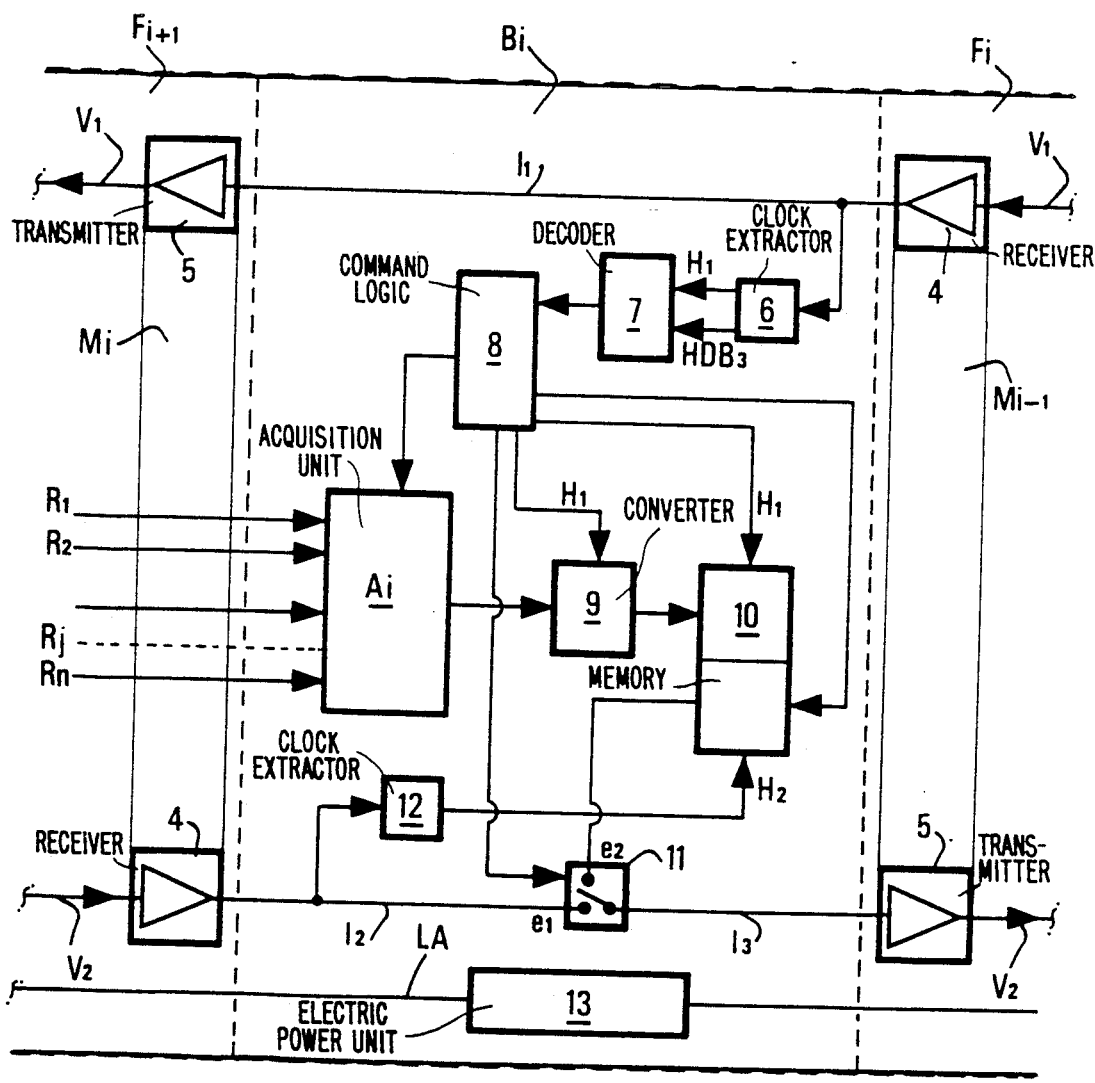
FIG. 2 diagrammatically shows a box intercalated between any two sections of the seismic streamer, containing a transmission set and its connections with the transmission channels.

The interconnection box $B_i$ shown in FIG. 2 comprises an element 6 connected to the output of receiver 4 of the module $M_{i-1}$, adapted for extracting the clock signal controlling the transmission of the coded signals from the central laboratory 2 (FIG. 1). The utilized transmission code is of the HDB3 type, well-known by specialists. As an example, FIG. 3 to 6 show the translation coded in HDB3 of a binary digital word. On two distinct outputs, element 6 produces the clock signal H1 and the digital words received in their coded form (HDB3). From these signals, a specialized decoder 7 reproduces the command words received from the central laboratory 2. The decoded signals are applied to a logical command set 8 adapted for controlling the acquisition, asynchronous with clock H1, of the seismic signals from the different receivers R1 to Rn, through acquisition apparatus Ai. For the purposes of the transmission on the optical fibers, the digitized data from acquisition apparatus Ai are coded following an appropriate code such as code CMI3, which is also well-known by transmission specialists. FIG. 7 shows an example of a digital word coded with this code CMI3.

The data converted into this code CMI3 by a specialized converter 9 are stored in a memory 10, of the FIFO type for example. The translating into code CMI3 and the storing of the coded words in memory 10 are controlled by clock signal H1.

The coded signals from receiver 4 of module Mi-1 are directly applied to transmitter 5 of the following module Mi by a line 11. Those from receiver 4 in module Mi are applied to an input terminal e1 of a two-position switch 11 by a line 12. The second input terminal of switch 11 is connected with the output of memory 10. The signals from switch 11 are applied to the input of transmitter 5 of the module Mi-1 by a line 13. Switch 11 is activated by a signal from the logical set 8.

The signals transmitted on channel V2 are controlled by a clock signal H2 of a frequency much higher than that of clock signal H1. The frequency of signal H2 is selected for example equal to 32.8 MHz, whereas that of H1 is 2.56 MHz. Clock signal H2 is generated by a clock (not shown) arranged, for example, in the last box at Bn the end of the streamer and thereby at the head of channel V2 for the data transmission.

The output of receiver 4 of module Mi is also permanently connected with an element 12 adapted for extracting clock signal H2 from the signals transmitted on channel V2. This signal is applied at the "clock" input of memory 10. The reading of the data stored in memory 10 at the frequency imposed by the second clock signal H2 is controlled by an appropriate signal coming from the logical command set 8.

Box Bi also contains an electric power pack 13 connected with an electric generator on the ship by supply lines LA.

Elements 6 to 12 are the transmission set TRi associated with acquisition apparatus Ai.

The quasi-asynchronous transmission method according to the invention essentially consists in performing successive interrogation cycles during which all the boxes along the streamer, from the furthest Bn to the closest B1, are sequentially interrogated. During one cycle, all the boxes Bi receive transmission orders which are staggered in relation to one another following a time interval T greater than the standard duration $\Delta t$ for the transmission of the signal samples. At the reception of a transmission order indicating any box Bi, (FIG. 8, instant ti), the corresponding logical command set 8, synchronized by clock H1, emits a signal for the reading of memory 10 where the coded signals to be transmitted are stored, and activates switch 11 so that input e2 is connected with output line 13. Since clocks H1 and H2 are not synchronized, the effective beginning of the reading of sample Si in memory 10 is staggered following a varying interval dt. This time-lag is one or several half periods of clock H2. The interval T is sufficient for the transmission of the coded sample by box Bi to be finished before the transmission order for the following box is effectively taken into account.

With the transmission method defined above, it is not necessary that the transmission set in each box detect the content of the data circulating on transmission channel V2 to locate by a bit the instants where the stored digital words should be placed. This lag latitude left to each box transmission set makes it possible to limit the amount of electronic elements which, in each box Bi, must work at the highest clock frequency H2. This actually concerns the reading part of the electronics of memory 10, switch 11 and element 12 extracting clock H2. This has a considerable effect on the manufacturing costs, all the more so since the number of electronic boxes of the most recent seismic streamers is often very high.

The method has been described applied to a seismic transmission system. It is obvious that, while remaining within the scope of the present invention such as it is defined by the claims, it can be adapted to any high-rate transmission system.

I claim:

1. A method of high-speed transmission of digital data from a plurality of data transmission sets to a central station, each data transmission set having associated therewith a signal acquisition apparatus for acquiring data signals, the plurality of data transmission sets being connected to the central station by a first channel, for transmitting control signals from the central station to the plurality of data transmission sets, and by a second channel, for transmitting data from the plurality of data transmission sets to the central station, said method comprising:

transmitting a first clock signal of a first frequency on the first channel from the central station to the plurality of data transmission sets;

transmitting control signals on the first channel at a first transmission rate, determined by the first clock signal, from the central station to the plurality of data transmission sets, the control signals including data storage control signals for the data transmission sets and data transmission control signals for assigning to each of the plurality of data transmission sets a data transmission interval;

within each data transmission set, in response to receipt on the first channel of data storage control signals, storing data, acquired by the associated signal acquisition apparatus, in a memory unit at a storage rate determined by the first clock signal;

within a first one of the plurality of data transmission sets, generating a second clock signal of a second frequency higher than the first frequency and transmitting the second clock signal to the second channel;

within each data transmission set other than said first one, receiving on the second channel the second clock signal and applying to the second channel the second clock signal and any data received on the second channel for transmission on the second channel at a second transmission rate determined by the second clock signal; and within each data transmission set, in response to receipt on the first channel of a data transmission control signal assigning to that data transmission set a data transmission interval, reading data from the memory unit of that data transmission set at a reading rate determined by the second clock frequency and applying the read data to the second channel for transmission at the second transmission rate to the central station during the assigned data transmission interval.

2. Apparatus for high-speed transmission of digital data from a plurality of data sources to a central station, said apparatus comprising a plurality of signal acquisition apparatuses, each signal acquisition apparatus uniquely associated with one of the data sources for receipt of data signals therefrom; a like plurality of data transmission sets, each data transmission set uniquely associated with one of said signal acquisition apparatuses; a first channel for transmitting a first clock signal of a first frequency and control signals, at a first transmission rate determined by the first clock signal, from the central station to said plurality of data transmission sets, the control signals including data storage control signals for the data transmission sets and data transmission control signals for assigning to each of the plurality of data transmission sets a data transmission interval; and a second channel for transmitting data from said plurality of data transmitting sets to the central station, one of said data transmission sets including clock means for transmitting on said second channel a second clock signal of a second frequency higher than the first frequency, each of said data transmission sets comprising:

a memory unit;

first means responsive to data storage control signals received on said first channel for storing in said memory unit, at a storage rate determined by the first clock frequency, data signals received by the associated signal acquisition apparatus; and second means responsive to receipt on said first channel of a data transmission control signal assigning a data transmission interval to that data transmission set for applying data signals from said memory unit to said second channel at a reading rate determined by the second clock frequency for transmission, at a second transmission rate determined by the second clock signal, to the central station during the assigned data transmission interval.

3. Apparatus as claimed in claim 2, wherein said second channel comprises an optical fiber, and electrical/optical conversion means for connecting each of said plurality of data transmission sets to said optical fiber.

4. Apparatus as claimed in claim 2, wherein said first means includes a logical command set responsive to data storage control signals received on said first channel for controlling receipt of data signals by said signal acquisition apparatuses and storage of the received data signals in said memory unit, and responsive to data transmission control signals received on said first channel for providing an enabling signal; and wherein said second means comprises switching means responsive to the enabling signal for connecting said memory unit to said second channel for transmission of data from said memory unit to the control station during the assigned data transmission interval.

5. Apparatus as claimed in claim 2, wherein each data transmission set further comprises a coding device for encoding the data signals prior to storage thereof.

6. A device as claimed in claim 2, wherein said memory unit comprises a FIFO memory device.

* * * * *